United States Patent
Li et al.

(10) Patent No.: US 7,281,448 B2
(45) Date of Patent: Oct. 16, 2007

(54) ONE-TOUCH MANUAL TELESCOPE AND TILT STEERING COLUMN

(75) Inventors: Xiaoyu Li, Saginaw, MI (US); Richard K. Riefe, Saginaw, MI (US); Richard E. Woycik, Saginaw, MI (US); Melvin L. Tinnin, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 370 days.

(21) Appl. No.: 10/803,337

(22) Filed: Mar. 18, 2004

(65) Prior Publication Data

US 2005/0204852 A1   Sep. 22, 2005

(51) Int. Cl.
*B62F 1/18* (2006.01)
(52) U.S. Cl. .......................................... 74/493; 74/492
(58) Field of Classification Search ................ 280/775; 74/492
See application file for complete search history.

(56) References Cited

U.S. PATENT DOCUMENTS

| | | | | |
|---|---|---|---|---|
| 3,396,600 | A * | 8/1968 | Zeigler et al. ................ | 74/493 |
| 4,179,137 | A * | 12/1979 | Burke ......................... | 280/775 |
| 5,199,319 | A * | 4/1993 | Fujiu ........................... | 74/493 |
| 5,590,565 | A * | 1/1997 | Palfenier et al. .............. | 74/493 |
| 5,669,270 | A * | 9/1997 | Cymbal et al. ................ | 74/493 |
| 5,738,377 | A * | 4/1998 | Sugiki et al. ................ | 280/777 |
| 5,979,265 | A | 11/1999 | Kim et al. ..................... | 74/493 |
| 6,131,481 | A * | 10/2000 | Wilson et al. ................ | 74/493 |
| 6,234,040 | B1 | 5/2001 | Weber et al. ................. | 74/493 |
| 6,237,439 | B1 | 5/2001 | Weber et al. ................. | 74/493 |
| 6,276,719 | B1 | 8/2001 | Gärtner ....................... | 280/775 |
| 6,405,612 | B1 * | 6/2002 | Kinoshita et al. ............. | 74/411 |
| 6,460,427 | B1 | 10/2002 | Hedderly ...................... | 74/493 |
| 6,623,036 | B2 | 9/2003 | Yamamura et al. ......... | 280/775 |
| 6,948,741 | B2 * | 9/2005 | Manwaring et al. ........ | 280/775 |
| 2005/0199087 | A1 * | 9/2005 | Li et al. ....................... | 74/493 |

* cited by examiner

*Primary Examiner*—Richard Ridley
*Assistant Examiner*—Terence Boes
(74) *Attorney, Agent, or Firm*—Michael D. Smith

(57) ABSTRACT

The invention provides a locking device for a tilting and telescoping steering column. The locking device provides a single mechanism for substantially preventing movement of the upper steering column jacket relative to the lower steering column jacket and also for preventing tilting movement of the tilt housing relative to the upper steering column jacket. The locking device includes a linking member that extends parallel to the upper steering column jacket. The linking member is pivotally connected to the tilt housing and slidably connected to the lower steering column jacket. A wedge member is positioned between the linking member and the upper steering column jacket adjacent to the lower steering column jacket. The wedge member is rotatable between a locked position and an unlocked position. In the locked position, the wedge member urges the linking member away from the upper steering column jacket in a direction transverse to the upper steering column jacket.

20 Claims, 4 Drawing Sheets

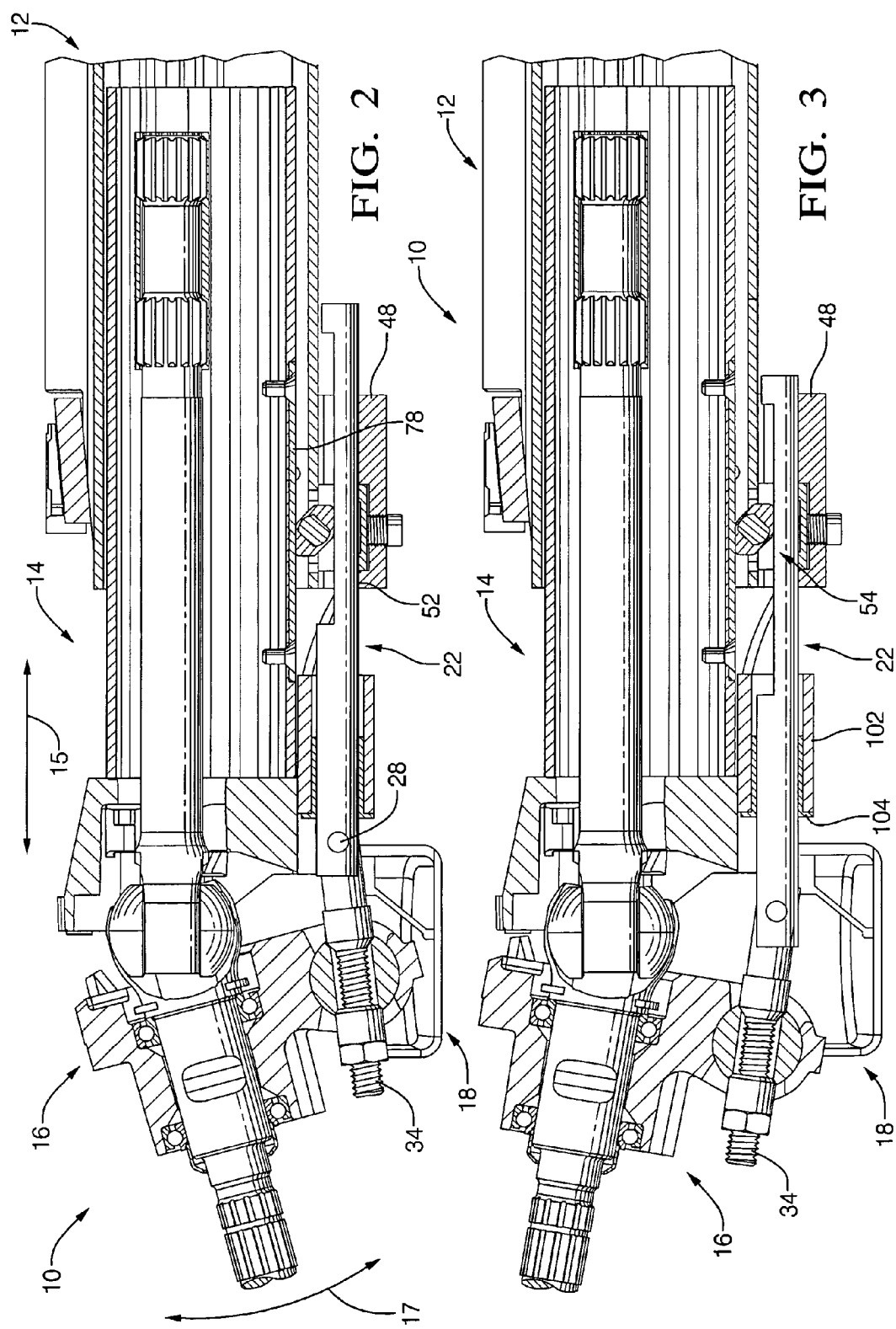

ONE-TOUCH MANUAL TELESCOPE AND TILT STEERING COLUMN

FIELD OF THE INVENTION

The invention relates to a steering column of a vehicle and more particularly to a tilting and telescoping steering column.

BACKGROUND OF THE INVENTION

Vehicles can be equipped with steering columns that adjust the position of the steering wheel to enhance the comfort and safety of the driver. For example, the steering column can telescope to move closer to and away from the driver. Also, the position of the steering wheel can be tilted relative to other components of the column. These features together operate to enable the driver to adjust the steering wheel to a desired, convenient position for operating the vehicle, and for enabling the wheel to be moved out of the way to provide greater access to getting into and out of the driver's seat of the vehicle.

SUMMARY OF THE INVENTION AND ADVANTAGES

The present invention provides an apparatus for adjusting the position of the steering wheel and a locking device for maintaining the position of the steering wheel. The apparatus includes a lower steering column jacket that is attachable to the vehicle. The invention also includes an upper steering column jacket that is engaged for telescoping movement with the lower steering column jacket. The invention also includes a tilt housing engaged for tilting movement with the upper steering column jacket. The lower steering column jacket, the upper steering column jacket, and the tilt housing are movably associated with one another to adjust the position of the steering wheel in the vehicle. The invention also provides a single locking device that limits both telescoping movement and tilting movement. The single locking device is moveable between an unlocked position and a locked position. When the locking device is in the unlocked position, the lower steering column jacket, the upper steering column jacket, and the tilt housing can be moved relative to one another to adjust the position of the steering wheel in the vehicle. When the locking device is in the locked position, the position of the steering wheel in the vehicle is substantially fixed.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a cross-sectional view of the embodiment of the invention shown in FIG. 1, wherein the column is telescopingly retracted and the tilt housing is tilted downwardly;

FIG. 3 is a cross-sectional view of the embodiment of the invention shown in FIG. 1 wherein the column is telescopingly extended and the tilt housing is tilted upwardly;

DETAILED DESCRIPTION OF THE PREFERRED EMBODIMENT

Figure 1:
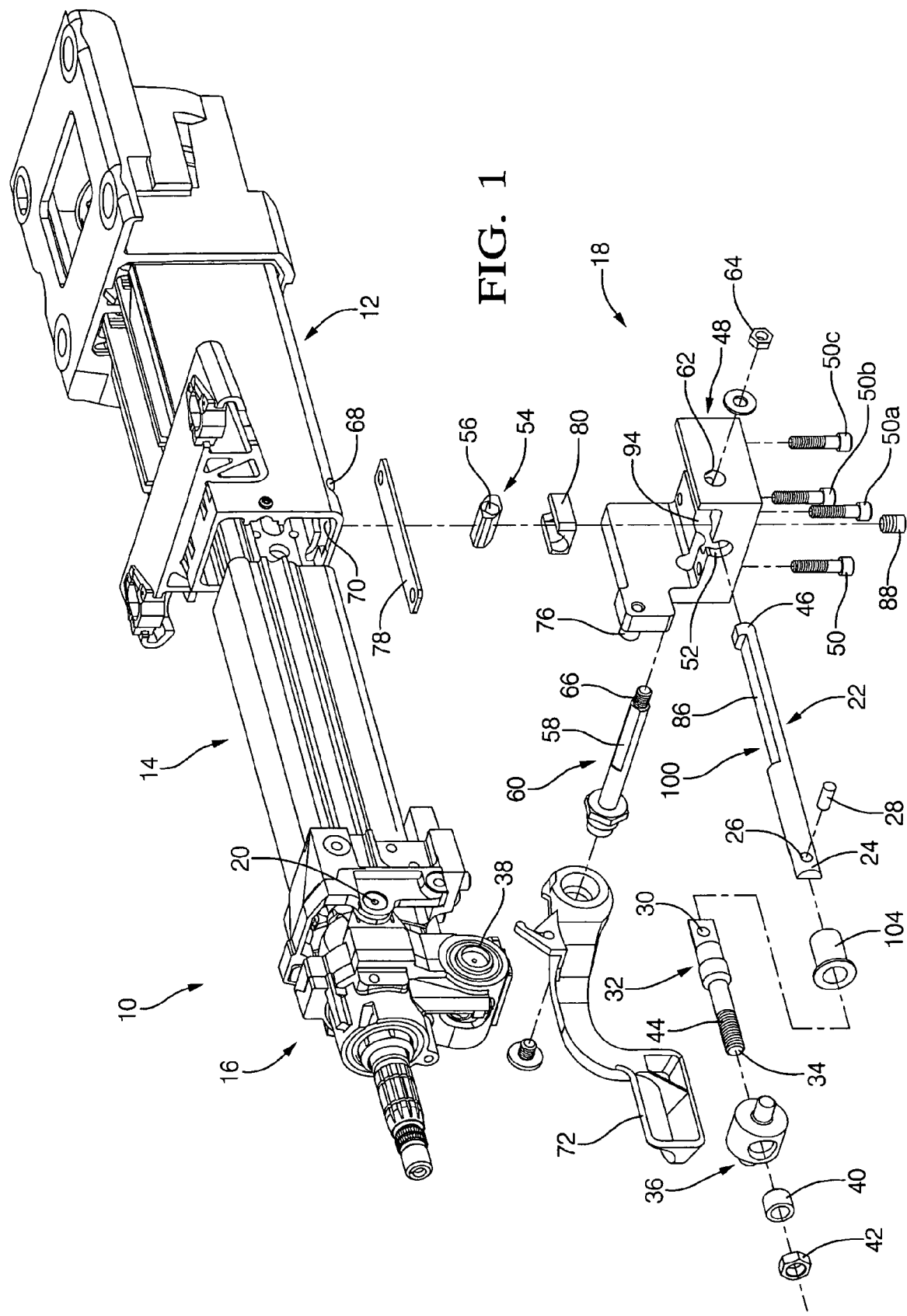
FIG. 1 is an exploded view of an apparatus for adjusting the position of a steering wheel in a vehicle according to the exemplary embodiment of the invention.
Figure 4:
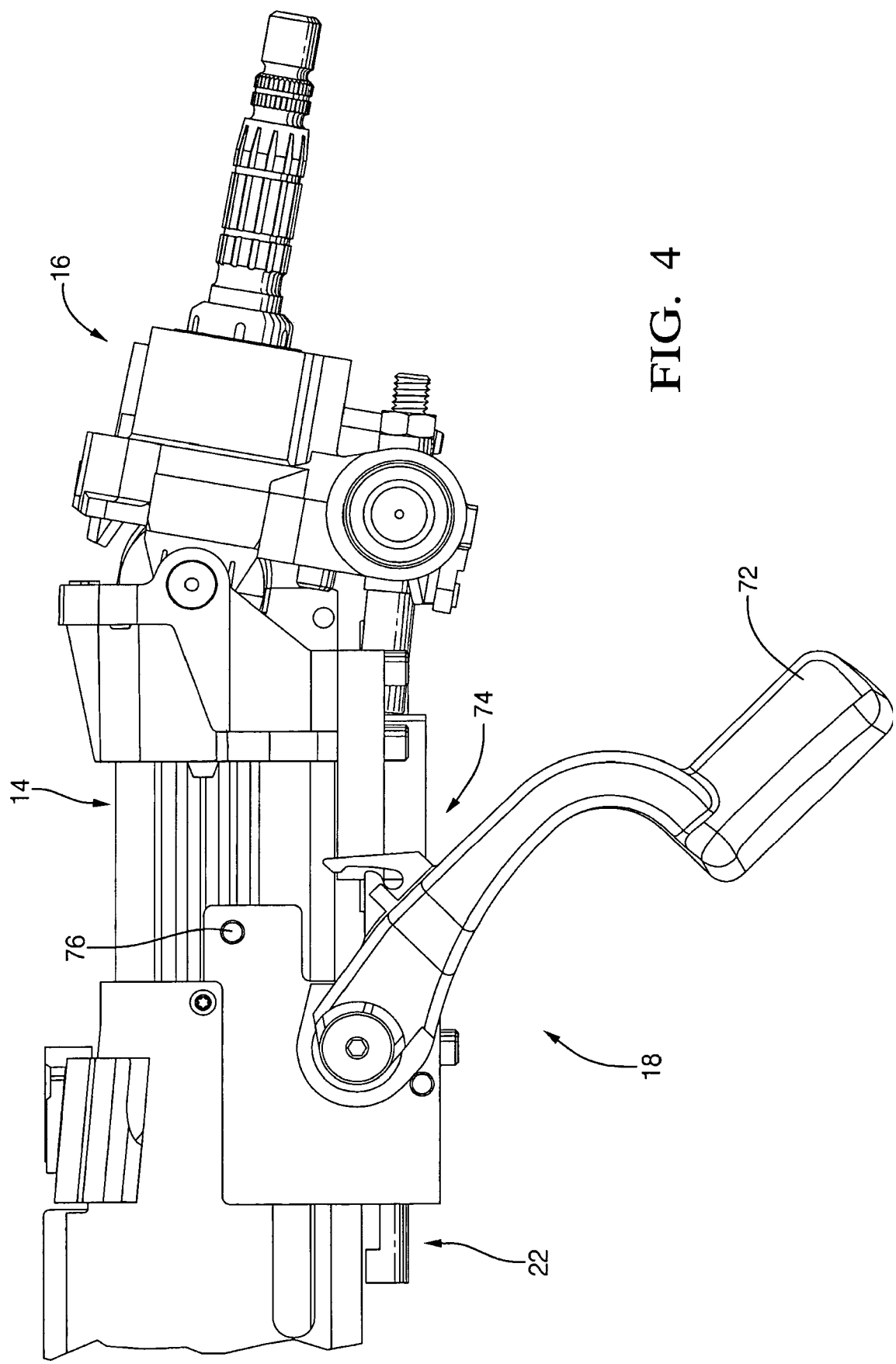
FIG. 4 is a side view showing a lever for engaging the single locking device of the exemplary embodiment of the invention.

Referring now to FIGS. 1 and 2, the invention provides an apparatus 10 for adjusting the position of a steering wheel in a vehicle. The apparatus 10 includes a lower steering column jacket 12 for attachment to the vehicle. The apparatus 10 also includes an upper steering column jacket 14 engaged for telescoping movement 15 with the lower steering column jacket 12. Relative movement between the upper steering column jacket 14 and the lower steering column jacket 12 positions the steering wheel in a desired longitudinal position relative to the lower steering column jacket 12. The invention also includes a tilt housing 16 engaged with the upper steering column jacket 14 for tilting movement 17. Relative movement between the tilt housing 16 and the upper steering column jacket 14 positions the steering wheel in a desired angular position relative to the upper steering column jacket 14. The tilt housing 16 tilts or pivots relative to the upper steering column jacket 14 about an axis 20.

Referring now additionally to FIG. 3, the apparatus 10 also includes a single locking device 18 for limiting the telescoping movement 15 and the tilting movement 17. The single locking device 18 is moveable between locked and unlocked positions. In the locked position, the single locking device 18 substantially prevents relative movement between the lower steering column jacket 12 and the upper steering column jacket 14 and between the upper steering column jacket 14 and the tilt housing 16. In the exemplary embodiment of the invention, the single locking device 18 includes a linking member 22 associated with the tilt housing 16 for pivoting movement that corresponds to tilting movement 17. For example, the linking member 22 moves in parallel relation to the upper steering column jacket 14 and the tilt housing 16 moves in tilting movement 17 in response to movement of linking member 22 relative to the upper steering column jacket 14. In other words, when the upper steering column jacket 14 and linking member 22 move in unison, the tilt housing 16 remains substantially fixed relative to the upper steering column jacket 14. In the unlocked position, the single locking device 18 is spaced from the linking member 22, accommodating relative movement between the lower steering column jacket 12 and the upper steering column jacket 14, and/or between the upper steering column jacket 14 and the tilt housing 16.

An adjustable connector 32 and a swivel member 36 interconnect the linking member 22 and the tilt housing 16. The linking member 22 includes a first end 24 defining an aperture 26. A pin 28 is inserted in the aperture 26 and also in an aperture 30 defined by the adjustable connector 32. The pin 28 defines a pivoting axis between the first end 24 and the adjustable connector 32. An end 34 of the adjustable connector 32 extends through the swivel member 36. The swivel member 36 is positioned in a correspondingly shaped aperture 38 in the tilt housing 16 and pivots relative to the tilt housing 16 during tilting movement 17. The adjustable connector 32 is releasably associated with the swivel member 36 with a bushing 40 and a nut 42. The nut 42 engages threads 44 defined by the adjustable connector 32.

The linking member 22 is associated with the lower steering column jacket 12 for sliding movement parallel to telescoping movement 15. The linking member 22 moves linearly relative to the lower steering column jacket 12 in response to tilting movement 17 of the tilt housing 16 and in response to telescoping movement of the upper steering column jacket 14. In the exemplary embodiment of the invention, the linking member 22 of the locking device 18 includes a second end 46 slidably associated with the lower steering column jacket 12. The single locking device 18 also includes a guide 48 connected to the lower steering column jacket 12 with fasteners, such as bolts 50, 50a, 50b, 50c. The guide 48 defines an aperture 52 for receiving the second end 46 of the linking member 22.

In the exemplary embodiment of the invention, the linking member 22 is also associated with the upper steering column jacket 14 for sliding movement parallel to telescoping movement 15. A guide 102 is connected to the upper steering column jacket 14 for supporting a bushing 104. The linking member 22 extends through the bushing 104 and is supported for sliding movement relative to the bushing 104.

Figure 5:
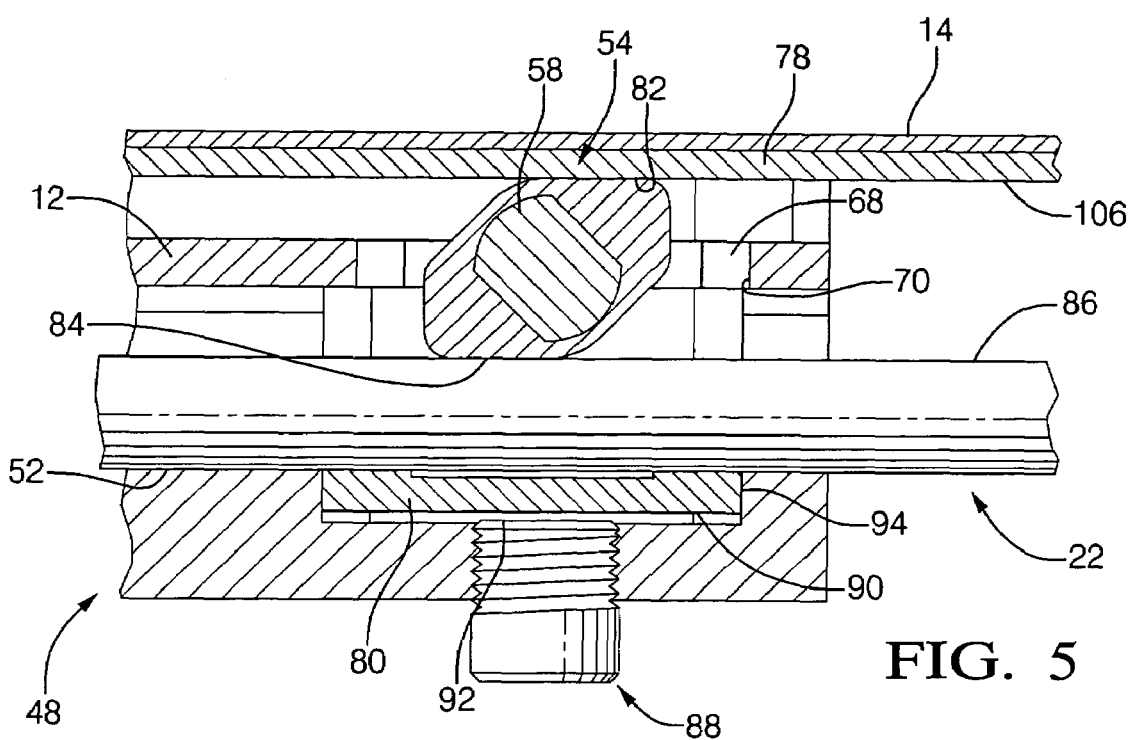
FIG. 5 is a detail view of a wedge member of the single locking device in a locked position.
Figure 6:
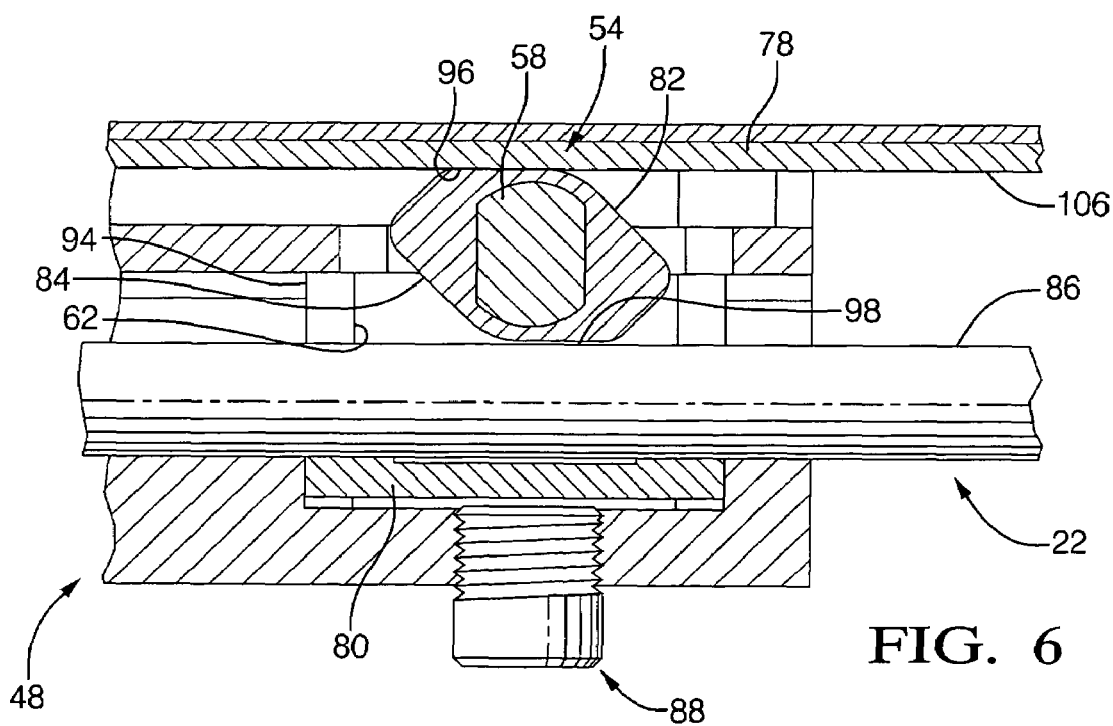
FIG. 6 is a detailed view of the wedge member shown in FIG. 5 in an unlocked position.

The single locking device 18 also includes a wedge member 54 selectively engageable with the linking member 22 and the lower steering column jacket 12 to prevent relative motion between a linking member 22 and the lower steering column jacket 12. As best shown in FIGS. 5 and 6 respectively, the wedge member 54 is rotatable between the locked position and the unlocked position. In the locked position, the wedge member 54 substantially prevents relative telescoping movement 15 between the lower steering column jacket 12 and the upper steering column jacket 14 and, as a result, tilting movement 17 between the upper steering column jacket 14 and the tilt housing 16.

Referring now to FIG. 1, the wedge member 54 defines an aperture 56 for receiving a portion 58 of a rod 60. The aperture 56 and the portion 58 are shaped to correspond to one another such that the wedge member 54 rotates in response to rotation of the portion 58. The wedge member 54 rotates about a longitudinal axis of the rod 60. The single locking device 18 of the exemplary embodiment also includes a lever 72 for rotating the rod 60. The lever 72 includes an integrally formed locking portion 74 that is releasably engageable in a snap fit relationship with a pin 76 defined by the guide 48. The rod 60 includes a threaded portion 66 and is releasably associated with the guide 48 with a nut 64.

The rod 60 extends through an aperture 62 defined by the guide 48 and an aperture 68 defined by the lower steering column jacket 12. The aperture 62 extends transverse to the linking member 22 and to the aperture 52. The apertures 62 and 68 cooperate to form a substantially common aperture to guide rotational movement of the rod 60. The apertures 62 and 68 define respective enlarged portions 94 and 70. The enlarged portion 94 of the aperture 62 communicates with the aperture 52. The enlarged portions 94, 70 are aligned such that the wedge member 54 is positioned in both enlarged portions 94, 70, best shown in FIGS. 5 and 6.

Referring now additionally to FIG. 1, the single locking device 18 includes engaging elements 78, 80 substantially fixedly associated with the upper steering column jacket 14 and the guide 48, respectively. The wedge member 54 is disposed between the engaging element 78 and the linking member 22. The linking member 22 is disposed between the wedge member 54 and the engaging element 80. When the wedge member 54 is in the locked position, a surface 82 of the wedge member 54 contacts a surface 106 of the engaging element 78 and a surface 84 of the wedge member 54 contacts a surface 86 of the linking member 22. The distance extending normal between the surfaces 82, 84 is greater than the free space between the surfaces 106, 86. As a result, the linking member 22 is urged against the engaging element 80.

The linking element 22 and the engaging element 80 frictionally engage one another. In other words, when the linking member 22 is urged against the engaging element 80, the linking member 22 and the engaging element 80 are substantially fixed relative to one another. The engaging element 80 is disposed in the enlarged portion 94 of the guide 48. The enlarged portion 94 and engaging element 80 are sized to correspond to one another such that the engaging element 80 is longitudinally fixed with respect to the guide 48. In other words, in the exemplary embodiment of the invention, the engaging element 80 does not move relative to the guide 48 in a direction parallel to the telescoping movement 15. As a result of the structural features recited above and because the guide 48 is fixedly connected to the lower steering column jacket, the linking element 22 is substantially fixed with respect to the lower steering column jacket 12 when the wedge element 54 is in the locked position.

The single locking device 18 can also include an adjustment element 88 that is adjustably engaged with the guide 48. The adjustment element 88 can be threadingly engaged with the guide 48 and adjusts the transverse position of the engaging element 80. In other words, movement of the adjusting element 88 toward or away from the lower steering column jacket 12 will move the engaging element toward or away from, respectively, the lower steering column jacket 12 and the linking member 22. For example, an outer surface 90 of the engaging element 80 will engage a surface 92 of the adjustment element 88 when the wedge member 54 is moved to the locked position.

When the wedge member 54 is in the unlocked position, as best shown in FIG. 6, the surface 82 is moved away from the surface 106 of the engaging element 78 and the surface 84 is moved away from the surface 86. A surface 96 defined by the wedge element 54 moves closer to the engaging element 78 and a surface 98 moves closer to the surface 86. The surface 98 is spaced from the surface 86 and the linking member 22 can substantially freely move relative to the wedge member 54.

The surface 86 is defined by a notch 100 formed in the linking member 22. The notch 100 is desirable to form a relative wider and flatter surface for engagement with the wedge member 54, rather than an outer cylindrical surface. The length of the notch 100 defines the length of permitted travel between the linking member 22 and the lower steering column jacket 12.

In operation, a driver of the vehicle engages the lever 72 to rotate the rod 60 and move the wedge member 54 to the unlocked position, best shown in FIG. 6. The linking member 22 is spaced from the wedge member 54 and slidable relative to the guide 48. The driver can adjust the position of the steering wheel by tilting the tilt housing 16 relative to the upper steering column jacket 14, by telescoping the upper steering column jacket 14 relative to the lower steering column jacket 12, or by both tilting and telescoping. After the driver has positioned the wheel as desired, the lever 72 is again engaged to rotate the rod 60 and move the wedge member 54 to the locked position, best shown in FIG. 5. The wedge member 54 as shown in FIG. 6 is rotated counter-clockwise to be moved into the locked position shown in FIG. 5. When the wedge member 54 is in the locked position, the relative movement between the tilt housing 16 and the upper steering column jacket 14 and between the upper steering column jacket 14 and the lower steering column jacket 12 is substantially prevented.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for adjusting the position of a steering wheel in a vehicle comprising:
   a lower steering column jacket for attachment to a vehicle;
   an upper steering column jacket engaged for telescoping movement with said lower steering column jacket for supporting a steering wheel in a desired longitudinal position relative to said lower steering column jacket;
   a tilt housing engaged for tilting movement with said upper steering column jacket for supporting the steering wheel in a desired angular position relative to said upper steering column jacket;
   a single locking device for limiting said telescoping movement and said tilting movement;
   wherein said single locking device includes a linking member extending parallel to said upper steering column jacket and connected to said tilt housing for linear movement in response to said tilting movement of said tilt housing;
   said single locking device having a guide connected rigidly to and supported continuously by said lower steering column jacket; and
   said locking device having a first aperture in said guide and extending longitudinally with respect to said jackets and wherein said linking member is supported by said guide for linear movement through said first aperture.

2. The apparatus of claim 1 wherein said linking member includes a first end pivotally connected to said tilt housing and a second end engaged releasably to said guide.

3. The apparatus of claim 2 wherein said single locking device includes a wedge member disposed between said upper steering column jacket and said linking member and being moveable between a locked position to urge said linking member and said upper steering column jacket away from one another in a direction transverse to said linear movement of said linking member and an unlocked position wherein said linking member is fitted loosely between said upper steering column jacket and said linking member.

4. The apparatus of claim 3 wherein said lower steering column jacket defines at least in-part an elongated second aperture with an enlarged portion wherein said wedge member extends laterally, with respect to said elongated second aperture, through said enlarged portion.

5. The apparatus of claim 4 wherein the guide having the first aperture receives said second end for longitudinal linear movement through the elongated first aperture and transverse movement through said enlarged portion.

6. The apparatus of claim 3 wherein said single locking device includes a first engaging element fixedly associated with said upper steering column jacket and adjacent to said wedging member.

7. The apparatus of claim 6 wherein said single locking device includes second engaging element movably associated with said guide and adjacent to said linking member.

8. An apparatus for adjusting the position of a steering wheel in a vehicle comprising:
   a lower steering column jacket for attachment to a vehicle;
   an upper steering column jacket engaged for telescoping movement with said lower steering column jacket for supporting a steering wheel in a desired longitudinal position relative to said lower steering column jacket;
   a tilt housing engaged for tilting movement with said upper steering column jacket for supporting the steering wheel in a desired angular position relative to said upper steering column jacket;
   a single locking device for limiting said telescoping movement and said tilting movement including a linking member extending parallel to and spaced from said upper steering column jacket and having a first end pivotally connected to said tilt housing and a second end slidably connected to said lower steering column jacket wherein said linking member moves linearly in response to said telescoping movement and said tilting movement; and
   wherein said linking member is monolithic.

9. The apparatus of claim 8 wherein said first end is further defined as being adjustably connected to said tilt housing.

10. The apparatus of claim 8 wherein said single locking device includes a wedge member disposed adjacent to said second end of said linking member and being moveable to a locked position to urge said linking member and said upper steering column jacket away from one another in a direction transverse to said linear movement of said linking member.

11. The apparatus of claim 10 wherein said lower steering column jacket is further defined as including a guide having a first aperture for receiving said second end and a second aperture for receiving said wedge member.

12. The apparatus of claim 11 wherein said lower steering column jacket defines a third aperture and said wedge member extends through said third aperture.

13. The apparatus of claim 12 wherein said second aperture includes an enlarged portion and said single locking device includes an engaging element disposed in said enlarged portion.

14. The apparatus of claim 13 wherein said engaging element is adjustably positioned relative to said linking member.

15. The apparatus of claim 13 wherein said second aperture is further defined as communicating with said enlarged portion.

16. An apparatus for adjusting the position of a steering wheel in a vehicle comprising:
   a lower steering column jacket for attachment to a vehicle;
   an upper steering column jacket engaged for telescoping movement with said lower steering column jacket for supporting a steering wheel in a desired longitudinal position relative to said lower steering column jacket;
   a tilt housing engaged for tilting movement with said upper steering column jacket for supporting the steering wheel in a desired angular position relative to said upper steering column jacket;
   a single locking device for limiting said telescoping movement and said tilting movement including a linking member extending parallel to and spaced from said upper steering column and having a first end pivotally connected to said tilt housing and a second end slidably connected to said lower steering column jacket wherein said linking member moves linearly in response to said telescoping movement and said tilting movement and said single locking device also including a wedge member rotatably associated with said lower steering column jacket and being moveable between a locked position and unlocked position;

said single locking device having a guide engaged rigidly to said lower steering column jacket;

an elongated first aperture extending parallel to said jackets and defined at least in-part by said guide, and wherein said linking member is supported by said guide and extends slidably through said first aperture; and an elongated second aperture traversing through said first aperture and defined at least in-part by said guide, and wherein said wedge member is supported by said guide for rotation in said second aperture.

17. The apparatus of claim 16 wherein said wedge member defines a pair of first surfaces extending substantially parallel to one another and spaced from one another a first distance wherein said first distance is greater than a second distance defined between said linking member and said upper steering column jacket.

18. The apparatus of claim 16 wherein said wedge member is received in a notch defined by said linking member.

19. The apparatus of claim 16 further comprising:

a locked position of said locking device wherein said wedge member is wedged between said upper steering column jacket and said linking member, and said linking member is biased against said guide preventing linear movement of said guide; and an unlocked position of said locking device wherein said wedge member is located between said upper steering column jacket and said linking member, and said linking member is located between said wedge member and said guide so that said linking member is free to move linearly through said first aperture.

20. The apparatus of claim 19 further comprising a resiliently flexible engaging element of said locking device connected rigidly to said upper steering column jacket and located between said wedge member and said upper steering column jacket, and wherein said engaging element is flexed resiliently when said locking device is in said locked position.

* * * * *